United States Patent [19]

Bauridl

[11] Patent Number: 4,558,203
[45] Date of Patent: Dec. 10, 1985

[54] HEATING APPARATUS FOR PACKAGED FOODSTUFF

[76] Inventor: Karl A. Bauridl, 10649 Twilight Dr., St. Louis County, Mo. 63128

[21] Appl. No.: 570,986

[22] Filed: Jan. 16, 1984

[51] Int. Cl.⁴ .................. H05B 1/00; B65D 83/00
[52] U.S. Cl. .................. 219/214; 221/150 A; 219/521; 219/405
[58] Field of Search .............. 219/214, 405, 411, 354, 219/521; 99/357, 389, 391, 426, 450; 221/297, 150 R, 150 HC, 150 A

[56] References Cited

U.S. PATENT DOCUMENTS

| | | | |
|---|---|---|---|
| 1,754,518 | 4/1930 | Kinnie | 219/214 |
| 2,864,932 | 12/1958 | Forrer | 219/411 |
| 2,957,973 | 10/1960 | Torrez | 219/411 |
| 3,037,443 | 6/1962 | Newkirk | 219/411 |
| 3,108,173 | 10/1963 | Barrett | 219/411 |
| 3,180,247 | 4/1965 | Hill | 219/214 |
| 3,304,406 | 2/1967 | King | 219/411 |
| 4,072,092 | 2/1978 | Köhli | 99/389 |
| 4,481,405 | 11/1984 | Malick | 219/405 |

FOREIGN PATENT DOCUMENTS

| | | | |
|---|---|---|---|
| 1199565 | 12/1959 | France | 219/405 |
| 293687 | 12/1953 | Switzerland | 99/391 |

Primary Examiner—C. L. Albritton
Assistant Examiner—Teresa J. Walberg
Attorney, Agent, or Firm—Gravely, Lieder & Woodruff

[57] ABSTRACT

Heating apparatus for prepackaged foodstuffs, like nut meats in transparent packages, in which the package is dropped into a support for presenting the sides of the package to infrared radiant heat which is delivered along with cooling air to prevent damaging the film material of the package. The apparatus includes controls for limiting the time of package exposure to the heat and mechanism to lock the package support against dumping the package until it has been heated, and to unlock the support when the heated package is ready to be dispensed.

9 Claims, 6 Drawing Figures

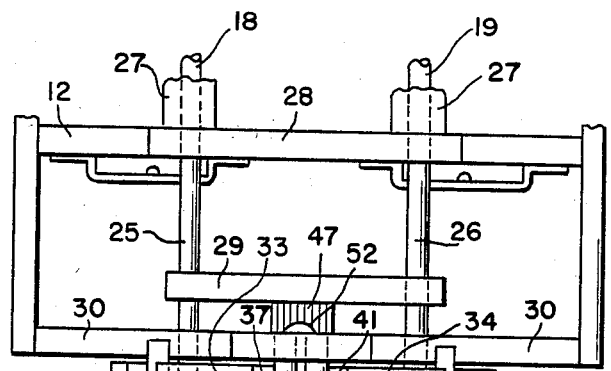
FIG. 3
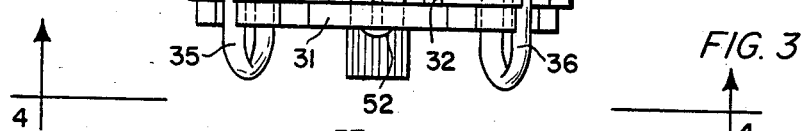
FIG. 4
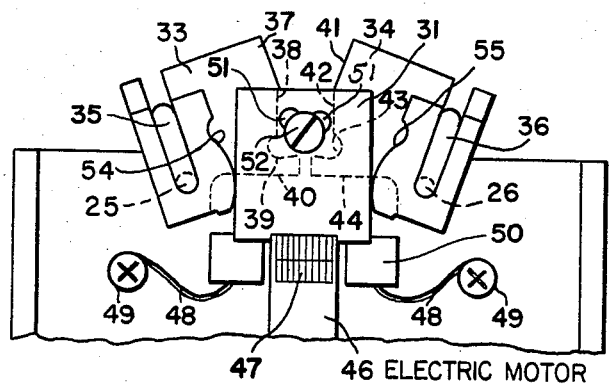
FIG. 5
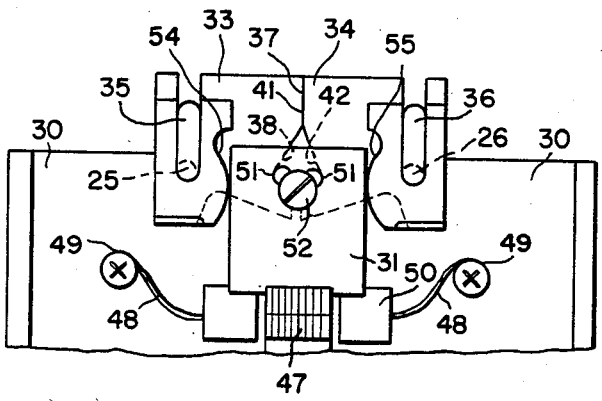

HEATING APPARATUS FOR PACKAGED FOODSTUFF

BACKGROUND OF THE INVENTION

1. Field of the Invention

This invention pertains to apparatus for warming or heating packaged foodstuff.

2. Description of the Prior Art

It is known from Forrer U.S. Pat. No. 2,864,932 of Dec. 16, 1958 that food when wrapped in a suitable transparent film can be cooked when exposed to an infrared heat source and enclosed in an oven with space for free circulation of air by convection. In Barrett et al U.S. Pat. No. 3,108,173 of Oct. 22, 1963 the infrared heating apparatus is adapted for broiling food items, and has its housing provided with expanded sheet metal panels for the free circulation of air or observation of the progress being made on heating the food items, and in addition, there is provided conventional electrical controls including timer means for broiling. An infrared oven for heating packaged frozen food is disclosed by King U.S. Pat. No. 3,304,406 of Feb. 14, 1967, and in which forced air movement is provided to prevent burning of the package due to the need for delivery of a large amount of heat to thaw the frozen food.

BRIEF DESCRIPTION OF THE INVENTION

The heating of packaged foodstuff, and particularly nut meats, makes the foodstuff more attractive, and can increase sales when the heating apparatus is adaptable for use in vending machines. Accordingly, the heating apparatus embodies infrared heat lamps for fast heating, and means to receive the foodstuff in its normal packaged form and present it to the infrared heat for the desired time to heat the contents without burning, charring or destroying the packages.

The apparatus is arranged with a package receiving grid which supports the package during heating, infrared lamps adjacent the grid, heat reflecting means for concentrating the radiant heat from the lamp, means to direct a flow of air upon the package from opposite sides to protect the packaging material, and mechanism for operating the grid in a predetermined cycle for retaining the package in the heat zone and effecting its discharge. A more detailed disclosure of the features and characteristics of the invention will appear presently.

The present invention is unique in several respects, one of which is embodied in the arrangement of a unique actuator which is normally in an inactive position to hold the package receiving means in a substantially locked position, and when actuated to allow the package receiving means to open up and dispense the heated package before being returned to its inactive position. It is also a unique improvement in the present invention to arrange a simple electrical control system which embodies adjustable timing means for sequencing the steps of turning on and off a heat source, initiating a blower for supplying cooling air, means for determining when the heated package is to be dispensed, and an overall timing device for ending the operation of the heat source, the air blower and the package dispensing means. The foregoing represent important objects to be obtained by the present invention

BRIEF DESCRIPTION OF THE DRAWINGS

The heating apparatus is disclosed in the accompanying drawings wherein:

FIG. 3 is an enlarged detail view of grid operating means in its normally relaxed position;

FIG. 4 is a detailed view of the grid operating means as seen from the end along line 4—4 in FIG. 3;

FIG. 5 is a view similar to FIG. 4, but with the grid operating means in its actuated or package release position.

DETAILED DESCRIPTION OF THE EMBODIMENT

Figure 1:
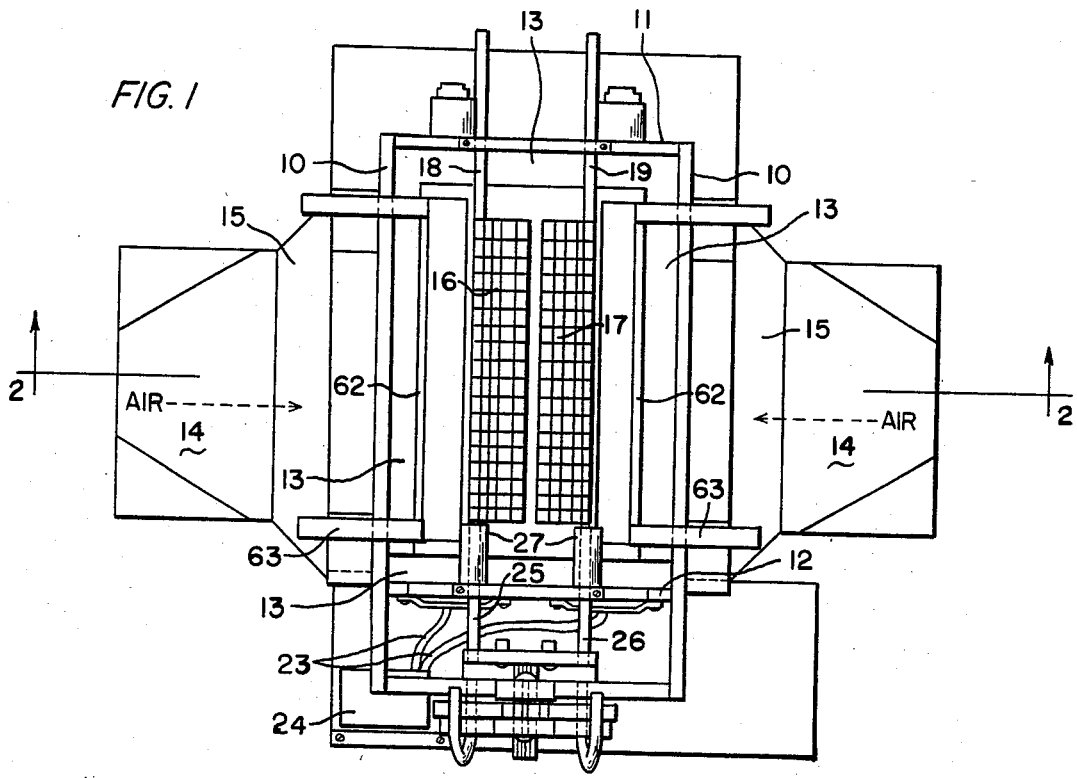
FIG. 1 is a plan view looking into the apparatus from the position of a dispenser which released a package to be heated.

Referring to FIG. 1, the apparatus is assembled in a frame having side walls 10 and opposite end walls 11 and 12. Each wall is lined on its interior with heat insulating material 13 to enclose a chamber where the packaged foodstuff is delivered for heating before being dispensed. Each side wall 10 is connected to air conduit means 14 having a flattened portion 15 so the air flow can be distributed in a wide stream having a dimension substantially equal to the length of the chamber between the end walls 11 and 12. The reason for the air flow will appear presently.

The chamber is provided with a pair of open mesh grid means 16 and 17 which are carried on individual shafts 18 and 19 supported from the top edges of the end walls 11 and 12 and arranged in parallel spaced relation so that on opposite rotation the grids 16 and 17 function as biparting supports of the packages of foodstuff as each is dispensed from an overhead package feeder 60 of currently available construction. The mesh grid means may be in the form of a series of spaced fingers instead of the mesh as shown in FIG. 1.

Figure 2:
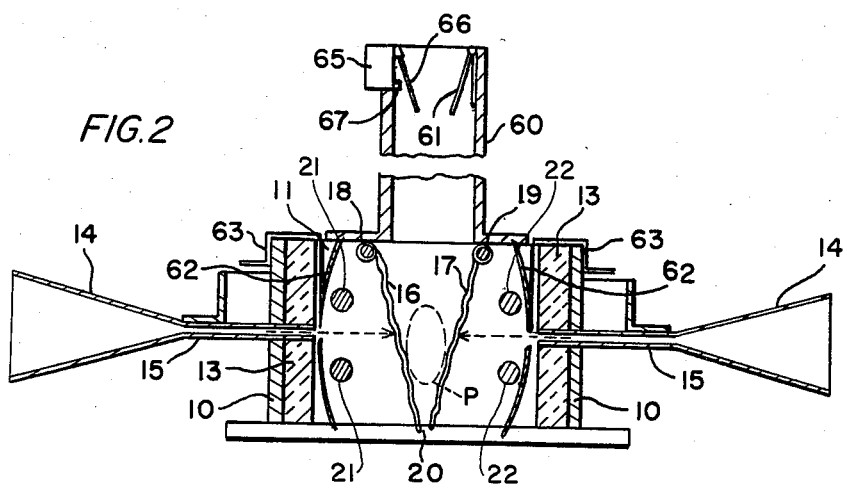
FIG. 2 is a sectional view of the apparatus taken along line 2—2 in FIG. 1.

As seen in FIG. 2 the grids 16 and 17 on shafts 18 and 19 respectively meet at the parting line 20 to form a V-shaped support in front of a pair of quartz heating lamps 21 adjacent grid 16 and a pair of quartz heating lamps 22 adjacent grid 17. The grid means cooperate to hold a package in proper position on its longitudinal edge so the greatest area of the sides are presented to the heat due to the V-shaped support they form. The pairs of heating lamps are spaced so that the portions 15 of the air conduit means can project through slots in the side walls 10 at a location to deliver a wide and flat stream of cooling air between the pairs of spaced lamps 21 and 22. Thus the delivered air is able to bathe the package in the grids 16 and 17 with air which keeps the heat from burning the material forming the package, even though the contents of the package is heated as desired. Suitable current carrying leads 23 extend from each quartz heating lamp 21 and 22 to a common junction box 24 where current can be brought in from an external source.

Turning now to FIGS. 3 and 4, it can be seen that shaft extensions 25 and 26 project beyond end wall 12. These extensions are connected in any suitable manner, as at joining sleeves 27, to the shafts 18 and 19. A bearing retainer block 28 holds the extensions in operative positions to project through a bearing support wall 29 and an outer split wall 30 which acts as a guide for the reciprocating movement of a drive block 31. The drive block is slotted at 32 in a direction so the slot is parallel to the split wall 30. The slot 32 receives grid actuator means 33 and 34 positioned to be engaged, respectively by the rebent end portion 35 of the shaft extension 25, and rebent end portion 36 of shaft extension 26.

In FIG. 4 the member 33 is shaped with an inner margin 37 at an angle which blends into a substantially vertically directed margin 38, and the latter margin leads into a recess 39 spaced from the bottom margin 40 of member 33. Similarly, the member 34 is formed with an inner margin 41 at an angle to the vertical which blends into a substantially vertical margin 42, and the latter margin leads into a recess 43 spaced from the bottom margin 44 of member 34. The marginal configurations of members 33 and 34 are shown in dotted outline as each is hidden (see FIG. 4) by the drive block 31, as the members are operable in the slot 32 of block 31.

An electric motor means 46 is disposed adjacent the wall 30, and for convenience is in the form of a solenoid in which its armature 47 is connected to the drive block 31 for reciprocating that block in a down direction (see FIG. 5) from its normal raised position of FIG. 4. The block is yieldably held in its raised position by a pair of spring elements 48 having one end anchored at 49 in the wall 30 and the working end portion (not shown) engaged in the base portions 50 of the drive block 31. The drive block 31 carries a pair of pins 51 which span the slot 32 so as to assume positions adjacent the substantially parallel margins 38 and 42 of the members 33 and 34 for completing the locking means. Pin retainers 52 are positioned in the block 31 at each end of the pins 51 to prevent the pins from working out of position. When the motor means 46 is energized (see FIG. 5) the drive block 31 is pulled down to bring the pins 51, after a lost-motion movement, past the margins 38 and 42 to unlock the members 33 and 34 into the recesses 39 and 43 for pivoting the members 33 and 34 toward each other about axes formed by the shaft extensions 25 and 26. The motion of the drive block 31 is held to a substantially linear path by the cam surfaces 54 and 55 on the respective members 33 and 34. When the current is cut off, springs 48 return the drive block 31 to its normal at rest raised position in which the grid means 16 and 17 are returned to the closed position seen in FIG. 2, and pins 51 engage the parallel surfaces 38 and 42 to lock the members 33 and 34 in positions to hold the grid means 16 and 17 closed in the V-shaped position. It is obvious that when the motor means 46 is energized the grid means 16 and 17 are first unlocked and then are pivoted to separate and allow the package to drop into a dispenser tray (not shown). This operated position is seen in FIG. 5.

Returning to FIG. 2, it is shown that a package receiving chute 60 is provided with a trip switch 65 having its actuating lever arm 66 projecting into the chute to be engaged by a package and pushed against button 67 to initiate a control circuit to be described. The chute 60 is provided with a yieldable spring arm 61 on the side opposite the switch 65 so the package P will be properly positioned to operate the switch as it falls into the grid means 16 and 17. Once the package P is received by the grids and the quartz lamps are energized, the air is supplied from an external source (not shown) to the conduits 14 for distribution by the portions 15 of the conduits between the pairs of quartz lamps to bathe the package. The quartz lamps are energized for a short period of time, and the heat is concentrated on the package P by reflectors 62 which are removably supported from the side walls 10 by brackets 63 which are formed to embrace the side walls 10 and the heat insulating means 13.

Figure 6:
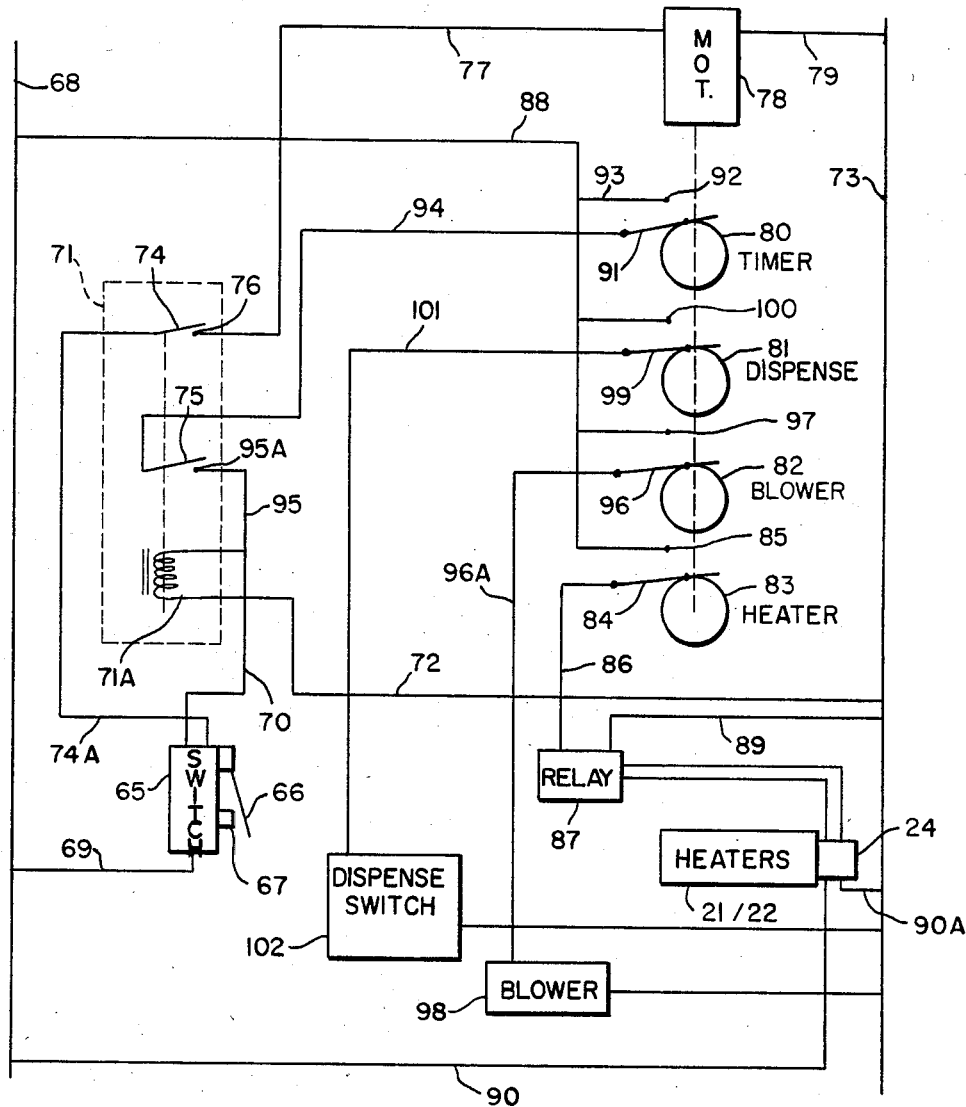
FIG. 6 is a schematic diagram of the electrical circuit for the heating apparatus.

There is shown in FIG. 6 a schematic arrangement for controlling the operation of the motor means 46 and the timing of the energization of the quartz lamps 21 and 22.

OPERATION

The schematic diagram of FIG. 6 shows the various operating components of the present invention in relation to a trip switch 65 with its movable arm 66 placed so a package to be heated will operate the arm by pressing it on the button 67 to make the starting circuit as follows: The switch 65 makes a circuit from the power line 68 through lead 69 to an internal contact for lead 70 to one side of relay 71 having coil 71A, the other side of the relay coil 71A is connected by lead 72 to the opposite power line 73. The energization of coil 71A closes relay arms 74 and 75. The arm 74 closes on contact 76 to make a circuit 77 to motor 78 and by lead 79 to power line 73. Also when relay arm 74 closes on contact 76 it places power line 73 in a circuit lead 74A which is connected to a second contact in switch 65 so when arm 67 is released upon the package dropping clear, the arm 66 releases button 67 which make contact in the switch body to power lead 69 so motor 78 will continue operating to close arm 91 on contact 92. Motor 78 rotates the gang of cams 80, 81, 82 and 83 on a common shaft. As the shaft rotates cam 83 closes its movable arm 84 on contact 85 to make a circuit by lead 86 to relay 87 and lead 88 to the power line 68. The opposite side of relay 87 is connected to the power lead 73 by lead 89. The relay operates a switch in junction box 24 to supply power by lead 90 from power line 68 and by lead 90A from power line 73 to the heat lamps 21 and 22 (see FIG. 2).

The next step in the sequence of operation is to time the cam 80 so it closes its movable arm 91 on the fixed contact 92 which connects by lead 93 into lead 88 to supply power from the power line 68 to lead 94 to the arm 75 in the relay 71 which is now closed on contact 95A to establish a holding circuit on the coil 71A through lead 72 to the power line 73 because the package will have cleared arm 66 to reposition the switch 65 so lead 74A is in circuit with lead 69 to power line 68 to maintain the motor 78 operative through relay arm 74. When this last circuit is established timing cam 80 completes a holding circuit to the coil 71A in relay 71. Shortly after cam 80 has established its circuit, cam 82 will function to close its movable arm 96 on the fixed contact 97 to power an air blower 98 through lead 96A for supplying air to the air inlets 14 (see FIG. 2) so the heat from lamps 21 and 22 will not damage the material of the package.

The cams 80, 82 and 83 will continue to function as described until cam 83 opens its circuit to turn off the heat lamps 21 and 22. At about the same time cam 81 will close its movable arm 99 on fixed contact 100 to energize circuit lead 101 to operate a dispense switch 102 for releasing the heated package. The switch 102 is in a circuit which includes the solenoid motor means 46 (see FIG. 4) for swinging the grids 16 and 17 to open for dispensing a heated package. When the timer cam 80 completes its rotary cycle it opens the holding circuit 94, 95, 72 to open relay 71 and stop motor 78.

RESUME

The heating apparatus of this invention provides a means for heating foodstuffs of various kinds, some of which may be bag-formed of a plastic film of transparent type to improve the attractive appeal of the nut meats when heated. The objects of the invention are carried out with simple apparatus that is able to raise the temperature of the contents of the package without burning or charring the film. The present apparatus is adapted to be incorporated in package dispensing machines of coin operated character so that a selection of nut meats or other edible foodstuffs can be heated in the merchandising package. A unique improvement is found in the use of the open work grid means to allow the exposure of the package sides to the heat and to the flow of air to keep the heat from damaging or charring the plastic film forming the package. The improvement also resides in the arrangement of a single electrically powered prime mover for actuating the grid means to release the heated package so it will not hang up in the heating area of the frame.

A preferred embodiment comprises an actuator for a pair of package supporting grid means having first means 25 and 26 for moving the grid means 16 and 17 between cooperating package supporting positions and package release positions, second means 33 and 34 for moving the first means to transmit simultaneous motion to the pair of grid means, and motor operated means 31 for actuating the second means 33 and 34. While the pair of grid means form a V-shaped support for positioning the package so its opposite major sides or surfaces are exposed to receive heat, it is recognized that alterations in the relationship of the grid means and the heat source may be made without materially departing from the object of holding each package in a desired position so the infrared heat can be effective.

The preferred embodiment represents the result of numerous experiments and tests to produce a desirably heated package. The tests have shown that the apparatus need only go through a maximum time from exposing a package formed of radiant energy transparent plastic film to radiant energy to the dispensing of about twelve (12) seconds when using quartz heating lamps. The package also requires a supply of air for almost the same length of time that the package is exposed to heat. While the heat lamps are energized for about eight (8) seconds beginning from the timing of the start of actuation of the package trip switch 65, the supply of air normally begins one to two seconds after the heating has started and continues for about 10 to 12 seconds until the end of the timing cycle. However, it may be desirable to continue air flow for a short time after the heated package is dispensed so the heating area has had time to cool between heating cycles, thereby avoiding overheating packages during a time when repetitive heating cycles occur. The heated package can usually be dispensed in the last one or two seconds of the maximum time cycle to accomplish the cooling of the area before the next cycle.

In view of the above disclosure, it will be understood that the objects of the invention are achieved and other advantages result from practice of the preferred embodiment.

What is claimed is:

1. In apparatus for heating foodstuffs packaged in radiant heat transparent wrappers, wherein the wrappers are heat penetrable and subject to destruction by heat, the improvement comprising:
   (a) frame means defining a vertical pass through passage for packages of foodstuffs for gravity movement;
   (b) a pair of vertically extending grid means operably carried dependently from upper ends by said frame means for relative movement between positions in which lower ends of said pair of grid means are in spaced relation for allowing a package of foodstuffs to pass by gravity drop through said frame means and to a heating position in which the lower ends of said pair of grid means are adjacently positioned to form a support for catching a package of foodstuffs;
   (c) radiant energy heating means fixed in said frame so as to be adjacent each of said grid means for generating package heat;
   (d) actuator means operably connected to said pair of grid means for moving said pair of grid means into said package support position and into said spaced relation for release of a package; and
   (e) air flow directing means connected to said frame means in position for directing the air flow past said heating means and directly onto a package caught by said pair of grid means whereby said package wrapper is protected from heat burn.

2. Heating apparatus set forth in claim 1 wherein said actuator means includes individual members connected one to each one of said grid means adjacent the upper ends thereof, an actuator element movable relative to both of said members for operating said members into positions to release a package, and other means for yieldably holding said individual members in package catching positions by said grid means.

3. In apparatus for heating foodstuffs packaged in radiant heat transparent wrappers, wherein the wrappers are heat penetrable and subject to destruction by heat, the improvement comprising:
   (a) frame means defining a pass through passage for packages;
   (b) a pair of package support grid means having spaced upper margins pivotally carried in said frame means, said grid means providing open mesh surfaces defining a space therebetween sized for receiving a package and said surfaces having lower margins movable into adjacency for supporting a package;
   (c) radiant energy heating means in said frame means in fixed position adjacent each of said grid means and outside of the space therebetween;
   (d) heat reflecting means positioned adjacent said heating means for directing the radiant energy heat toward the space between said grid means through the open mesh surfaces;
   (e) actuator means connected to said grid means for pivoting said grid means between first locked positions with said lower margin adjacent for supporting packages therebetween with its surfaces exposed to the radiant energy heat through the open mesh and second unlocked positions with said open mesh surfaces spaced from each other for releasing the heated package; and
   (f) air flow directing means connected to said frame means to deliver air upon each side of the package supported by said open mesh surfaces of said grid means for protecting the heat transparent wrapper against heat destruction.

4. The heating apparatus for foodstuffs packaged in radiant heat transparent wrappers as set forth in claim 3 wherein said actuator means comprises:
   (a) first means connected to said spaced pivoted margins for moving the open mesh surfaces of said grid means between positions in which said open mesh surfaces are angularly related into a V-shaped package catching form with said lower margins adjacent and positions with said lower margins spaced apart for releasing a package;
   (b) second means connected to said first means for substantially simultaneously moving said open mesh surfaces into separated positions for releasing a package; and
   (c) third means connected to said second means for normally positioning said first means in position moving said grid means into package receiving position.

5. The actuator means set forth in claim 4 wherein said third means includes an electrically operated motor means.

6. The actuator means set forth in claim 4 wherein said second means includes elements operable to limit said grid means to movement between the V-shaped relation and the spaced apart relation.

7. The actuator means set forth in claim 4 wherein said third means includes resilient elements normally effective to hold said first and second means with said lower margins of said grid means in adjacent positions angularly related, said resilient elements engaging said third means.

8. The apparatus set forth in claim 3 wherein:
   (a) said radiant energy heating means comprises a pair of spaced infrared quartz lamps adjacent each of said grid means; and
   (b) said air flow directing means comprises ducts having outlet nozzles directing the air flow through the space between said infrared quartz lamps and directly upon a package being heated.

9. In apparatus for heating the contents of packages wrapped in radiant heat transparent film, the improvement comprising:
   (a) frame means defining a package pass through passage;
   (b) radiant energy heating means fixed in said frame in spaced relation at opposite sides of the pass through passsage;
   (c) package supporting grid means mounted in said pass through passage between said heating means, said grid means having pivot means connected with first margins for supporting said grid means with said first margins spaced apart; and said grid means having second margins selectively separated to release a package and in adjacency to catch a package entering said grid means;
   (d) actuating members connected to said pivot means for movement with said grid means between the selectively separated and adjacent positions of said second margins;
   (e) drive means operably connected to said actuating members and movable between a first position in which said actuating members are moved to positions in which said second margins of said grid means are adjacent;
   (f) motor means connected to said drive means for moving it to operate said actuating members into positions to separate said grid means;
   (g) resilient means engaged with said drive means for normally moving it to hold said actuating members in position to said grid means have said second margins adjacent; and
   (h) air flow directing means carried by said frame means in position to direct air past said radiant heating means and directly upon a package caught by said grid means.

* * * * *

UNITED STATES PATENT AND TRADEMARK OFFICE
CERTIFICATE OF CORRECTION

PATENT NO. : 4,558,203
DATED : December 10, 1985
INVENTOR(S) : Karl A. Bauridl

It is certified that error appears in the above-identified patent and that said Letters Patent are hereby corrected as shown below:

Column 8, line 33, "to said" should be "so said".

Signed and Sealed this

Twenty-fifth Day of February 1986

[SEAL]

Attest:

DONALD J. QUIGG

Attesting Officer

Commissioner of Patents and Trademarks